Jan. 21, 1969    G. S. WORCESTER    3,422,938
SEAT AND CARRY CASE

Original Filed May 16, 1966    Sheet 1 of 2

INVENTOR.
Gurdon S. Worcester
BY
Roberts, Cushman & Grover
ATT'YS

Jan. 21, 1969    G. S. WORCESTER    3,422,938
SEAT AND CARRY CASE
Original Filed May 16, 1966    Sheet 2 of 2
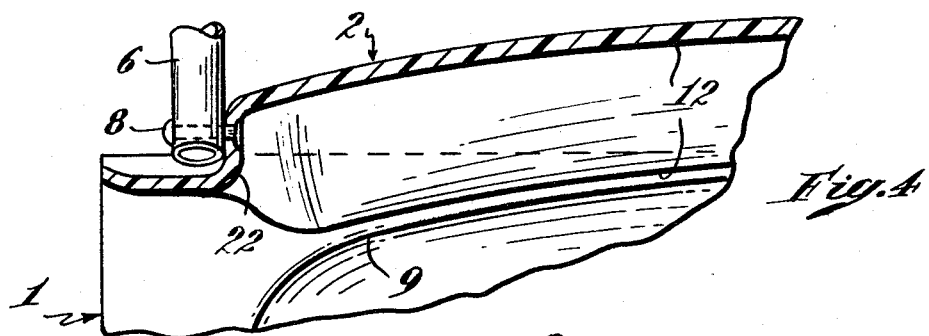
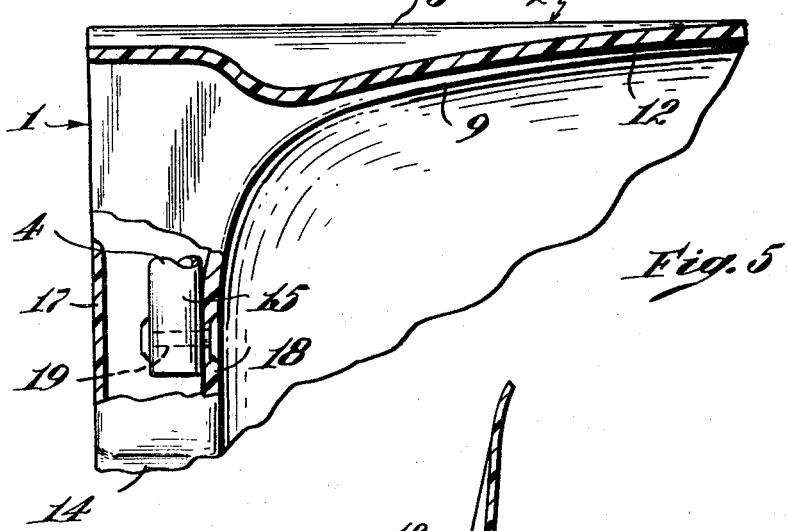
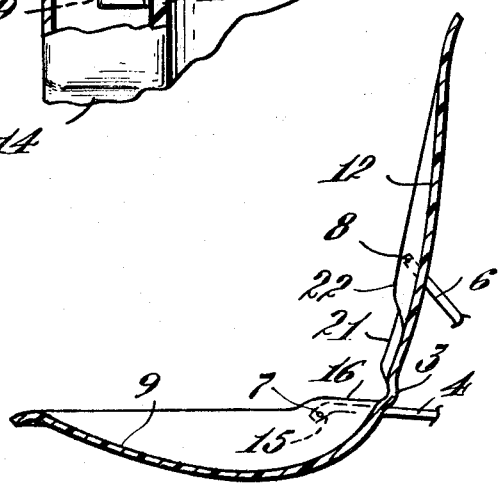
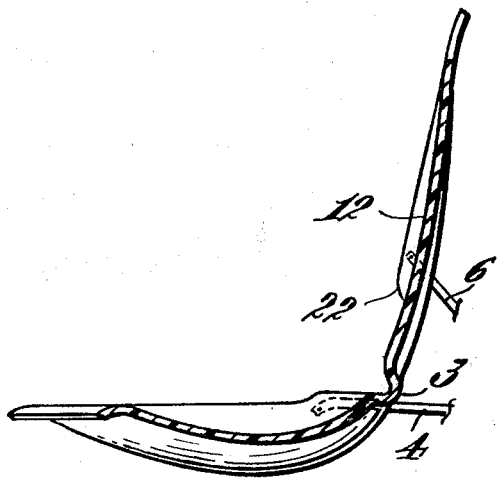

United States Patent Office 3,422,938
Patented Jan. 21, 1969

3,422,938
SEAT AND CARRY CASE
Gurdon S. Worcester, High St., Gloucester, Mass. 01930
Continuation of application Ser. No. 550,249, May 16, 1966. This application Jan. 22, 1968, Ser. No. 728,867
U.S. Cl. 190—8                 7 Claims
Int. Cl. A45c 9/00; A47c 13/00

ABSTRACT OF THE DISCLOSURE

A combined seat and carry case formed of concave seat and back walls joined by an integral hinge and folding between a closed, case position and an open, seat position. Bails are attached to the seat and back for carrying the case closed and for bracing the seat in open position.

---

This application is a continuation of application No. 550,249, filed May 16, 1966, and now abandoned.

The object of the invention is to afford a more comfortable seat and back rest with firm support for the user, and at the same time provide a simply and quickly folded carry case with a substantial internal storage space.

According to the invention a carry case comprises first and second walls having mating peripheral edges with an interior concavity between the edges of at least one wall, hinge means interconnecting said walls to permit the walls to swing between a closed, mating position in which said edges and concavity enclose a compartment for holding articles, and an open position in which one of said walls forms a seat and the other a back rest, and handle means pivotally connected to at least one of said walls to move between a carry position in which the closed walls are suspended from the handle means and a support position in which the handle means braces said one wall when used as a seat or back.

For the purposes of illustration a typical embodiment of the invention is shown in the accompanying drawings in which:

FIGS. 4 to 7 are sections respectively on lines 4—4 to 7—7 of FIG. 3, parts being omitted.

Figure 1:
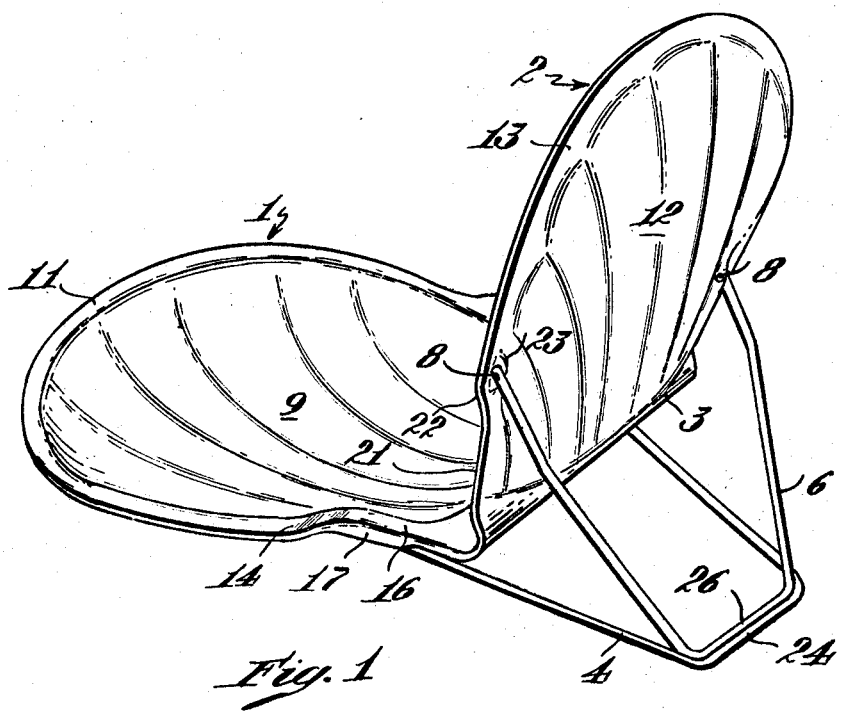
FIG. 1 is an isometric view of the article opened for use as a seat.

As shown in the figures the combination seat and carry case comprises two walls 1 and 2 joined by an integral hinge 3. The walls are preferably molded as a unit of any sturdy, rigid plastic with a relatively flexible interconnecting hinge. Two U-shaped bails 4 and 6 are pivotally attached at points 7 and 8 to the walls 1 and 2 which respectively serve as a seat and back rest. As will be explained in detail, the bails serve the dual function of bracing the seat back in the open position shown in FIG. 1, and also holding the two walls together in the closed position shown in FIG. 2.

Figures 2, 3:
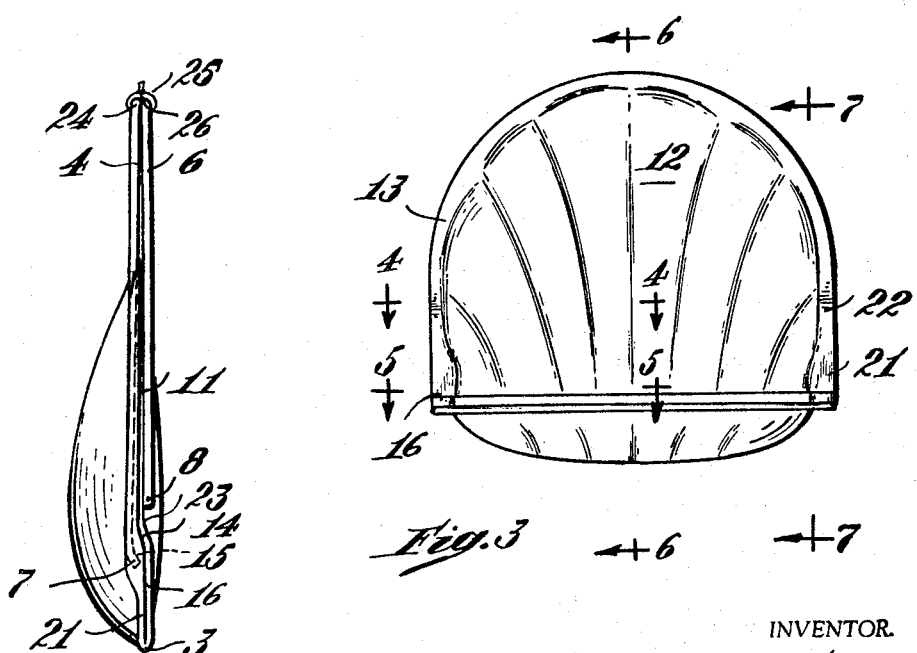
FIG. 2 is a side view showing the folded case.
FIG. 3 is a front elevation of the open seat.

The seat wall 1 has an interior concavity 9 bounded by a peripheral lip 11. Toward the hinge 3 the lip 11 of wall 1 has a rise 14 to a flat 16 which extends to the hinge 3 forming an arm rest. An apron 17 depends from the flat 16 just rearwardly of the rise 14. Between the apron 17 and an opposing portion 18 of the wall 1 the end 15 of the lower bail 4 is pivoted to the portion 18 at point 7 by a screw or rivet 19. As shown in FIG. 2, the end 15 of the bail 4 is angled away from the general plane of the U-shaped bail, and the pivot point 7 is correspondingly offset from the flat 16 so that in the closed position of the case the end is angled away from the general plane of the U-shaped bail, and the pivot point 7 is correspondingly offset from the flat 16 so that in the closed position of the case the angled end 15 of bail 4 allows the sides of the bail to lie flat against the underside of the lip 11, while in the open position of the seat the sides of the bail bear against the underside of the arm rest 16 so that the bail 4 acts as a cantilever to brace the seat 1 against tipping backward.

Similarly to the seat 1, the back 2 has an interior concavity 12 bounded by a peripheral lip 13. Each side of the lip rises from a flat 21 to a boss 22 having a rearwardly extending flat 23 to which one end of the bail 6 is pivoted. When the seat is opened, the shorter cross member 26 of bail 6 engages inside the cross member 24 of bail 4. Both bails 4 and 6 are supported by the ground, the interengagement of bail 6 in bail 4 preventing the more divergent bail 6 from sliding downwardly or rearwardly, so that bail 6 supports the back wall 2 as a strut.

The flat 21, boss 22 and lip 13 of the back 2 mate respectively with the flat 16, rise 14 and lip 11 of the seat, so that when the structure is closed, as shown in FIG. 2, they enclose an interior compartment formed by the concavities 9 and 12 of the seat 1 and back 2 in which other articles may be carried. In this position, the back bail 6 may be swung to a position parallel to the back of the lip 13, and so that the cross bar 24 of bail 4 lies next and parallel to the cross bar 26 of bail 6. The cross bars may be held together by a hand grip, tie cord or other detent and serve both as a handle to carry the closed case and as a clamp by which the bails hold the seat and back closed.

As shown most clearly in FIGS. 4 to 7 the seat and back concavities 9 and 12 are curved in both horizontal and vertical planes, and at the same time form portions of a continuous curve despite the fact that the hinge 3 is linear. The curves of the concavities 9 and 12 are shown in a horizontal plane through the pivot 8 in FIG. 4 and in a horizontal plane just above the hinge 3 in FIG. 5. In both these figures it can be seen that the horizontal curvature of the back concavity 12 parallels the adjacent horizontal curvature of the seat concavity 9.

In the central vertical plane of FIG. 6, the curvature of concavity 12 is substantially continuous with the curvature of concavity 9 with a slight gap at the hinge 3. In the vertical plane of FIG. 7 close to the boss 22, the vertical curvatures of concavities 9 and 12 are portions of a continuous curve which is offset from the line of hinge 3 more than the above mentioned central curve. Consequently the hinge may extend the full width of the seat and back without presenting an uncomfortable ridge protruding inwardly of the curves of the concavities.

With the described structure both a comfortable seat and back rest are provided in combination with a carry case which is easily folded by swinging the bails to a position in which they form a handle clamping the case closed and suspending the case.

I claim:
1. A combination seat and carry case comprising:
   first and second walls having mating peripheral edges with an interior concavity between the edges of at least one wall,
   hinge means interconnecting said walls to permit the walls to swing between a closed, mating position in which said edges and concavity enclose a compartment for holding articles, and an open position in which one of said walls forms a seat and the other a back rest, and
   two bail members pivoted to said walls respectively, to move between a carry position in which the closed walls are suspended from the bails and a support position in which the bails brace one wall when used as a seat or back, each bail being adapted to engage a peripheral edge of a shell thereby to hold the walls clamped in closed position.
2. The combination according to claim 1 wherein said bails are shaped to brace both said seat and back when in support position.

3. The combination according to claim 2 wherein said bails comprise interengaging portions preventing relative movement of the bails, seat and back when in support position.

4. A combination seat and carry case comprising:
first and second walls of rigid material having mating peripheral edges and each wall having a performed rigid interior concavity between said edges,
hinge means interconnecting said walls to permit the walls to swing between a closed mating position, in which said edeges and concavity enclose a compartment for holding articles, and an open position in which one of said walls forms a seat and the other a back rest, and
means for holding said walls in said open position,
the surfaces of said walls on either side of said hinge means forming a substantially continuous contour from one wall to the other past said hinge. thereby to form a substantially continuous support for the seat and back of the user when the walls are held in open position.

5. The combination according to claim 4 wherein the contours of the walls are part of a continuously curved surface offset away from the line of said hinge means.

6. The combination according to claim 5 wherein the curved portions of said seat and back are spaced farther from said hinge line at the ends of the hinge than at the middle of the hinge.

7. The combination according to claim 4 wherein each said wall has a concavity whose contour is curved substantially continuously with the contour of the other wall, thereby to form a substantially continuous support for the seat and back of the user when the walls are held in open position.

References Cited

UNITED STATES PATENTS

| | | | |
|---|---|---|---|
| 2,915,154 | 12/1959 | Holder | 190—8 |
| 3,092,224 | 6/1963 | O'Neil | 190—8 |

DONALD F. NORTON, *Primary Examiner.*

U.S. Cl. X.R.

297—17, 378, 457, 129